United States Patent
Huo et al.

(10) Patent No.: US 10,267,427 B2
(45) Date of Patent: Apr. 23, 2019

(54) SPRING ADJUSTING DEVICE AND VALVE ASSEMBLY

(71) Applicant: EMERSON PROCESS MANAGEMENT REGULATOR TECHNOLOGIES, INC., McKinney, TX (US)

(72) Inventors: Yuxiong Huo, Chengdu (CN); Xiao Xiao, Sichuan (CN); Yanwei Lei, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/437,823

(22) PCT Filed: Oct. 22, 2013

(86) PCT No.: PCT/CN2013/085722
§ 371 (c)(1),
(2) Date: Apr. 22, 2015

(87) PCT Pub. No.: WO2014/063620
PCT Pub. Date: May 1, 2014

(65) Prior Publication Data
US 2015/0292636 A1    Oct. 15, 2015

(30) Foreign Application Priority Data
Oct. 22, 2012 (CN) .................... 2012 2 0565995 U

(51) Int. Cl.
*F16K 17/06* (2006.01)
*F16K 31/126* (2006.01)
(Continued)

(52) U.S. Cl.
CPC .............. *F16K 17/06* (2013.01); *F16F 1/121* (2013.01); *F16K 31/1264* (2013.01); *G05D 16/0636* (2013.01)

(58) Field of Classification Search
CPC .. F16K 17/06; F16K 31/1264; G05D 16/0636
See application file for complete search history.

(56) References Cited

U.S. PATENT DOCUMENTS

| | | | | |
|---|---|---|---|---|
| 1,408,923 A | * | 3/1922 | Bastian | G05D 7/0106 137/505.15 |
| 1,491,192 A | * | 4/1924 | Burdett | G05D 16/0611 137/505.44 |

(Continued)

FOREIGN PATENT DOCUMENTS

| CN | 201615266 U | 10/2010 |
|---|---|---|
| CN | 201739584 U | 2/2011 |
| CN | 202972059 U | 6/2013 |

OTHER PUBLICATIONS

Search Report for PCT/CN2013/085722, dated Jan. 23, 2014.
Written Opinion for PCT/CN2013/085722, dated Jan. 23, 2014.

*Primary Examiner* — Craig Schneider
*Assistant Examiner* — Frederick D Soski
(74) *Attorney, Agent, or Firm* — Marshall, Gerstein & Borun LLP

(57) ABSTRACT

A spring adjusting device and a valve assembly including the same. The spring adjusting device includes an adjusting screw rod, a spring, and a spring seat which is located between the adjusting screw rod and the spring. A groove is arranged in the spring seat, which can contain an end part of one end of the adjusting screw rod, and is provided with a cylindrical side wall. The spring adjusting device can prevent the end part of the adjusting screw rod from being separated from the groove, and the spring from being bent (Continued)

on the whole, thereby improving the overall working performance of the valve assembly.

6 Claims, 5 Drawing Sheets

(51) Int. Cl.
  G05D 16/06 (2006.01)
  F16F 1/12 (2006.01)

(56) References Cited

U.S. PATENT DOCUMENTS

| | | | | |
|---|---|---|---|---|
| 1,491,193 A * | 4/1924 | Burdett | ............ | G05D 16/0663 137/505.45 |
| 1,620,322 A * | 3/1927 | Browne | ............ | G05D 16/0655 137/115.13 |
| 2,447,067 A * | 8/1948 | Hamilton | ............ | G05D 16/0663 137/505.42 |
| 2,542,167 A * | 2/1951 | Teague, Jr. | ............ | G05D 16/0619 137/510 |
| 2,655,930 A * | 10/1953 | Towler | ............ | F16K 17/0473 137/114 |
| 2,950,739 A * | 8/1960 | Lofink | ............ | F16J 3/06 92/6 D |
| 2,974,679 A * | 3/1961 | Heller | ............ | F16K 31/145 137/489.3 |
| 3,495,619 A * | 2/1970 | Tomomitsu | ............ | F16K 31/36 137/116.5 |
| 5,082,239 A * | 1/1992 | Feild | ............ | F16K 1/36 137/510 |
| 5,931,182 A * | 8/1999 | Craft | ............ | G05D 16/10 137/116.5 |
| 2002/0170601 A1* | 11/2002 | Smith | ............ | G05D 16/103 137/505.42 |
| 2011/0284102 A1* | 11/2011 | Schneider | ............ | F16K 1/487 137/505.47 |
| 2012/0168005 A1* | 7/2012 | Rull | ............ | F16K 17/04 137/536 |
| 2014/0261785 A1* | 9/2014 | Andersson | ............ | G05D 16/0658 137/505 |
| 2015/0277451 A1* | 10/2015 | Huo | ............ | F16K 31/1264 137/505 |
| 2015/0292636 A1* | 10/2015 | Huo | ............ | F16K 31/1264 137/541 |
| 2015/0300523 A1* | 10/2015 | Huo | ............ | F16K 31/1264 137/492.5 |

* cited by examiner

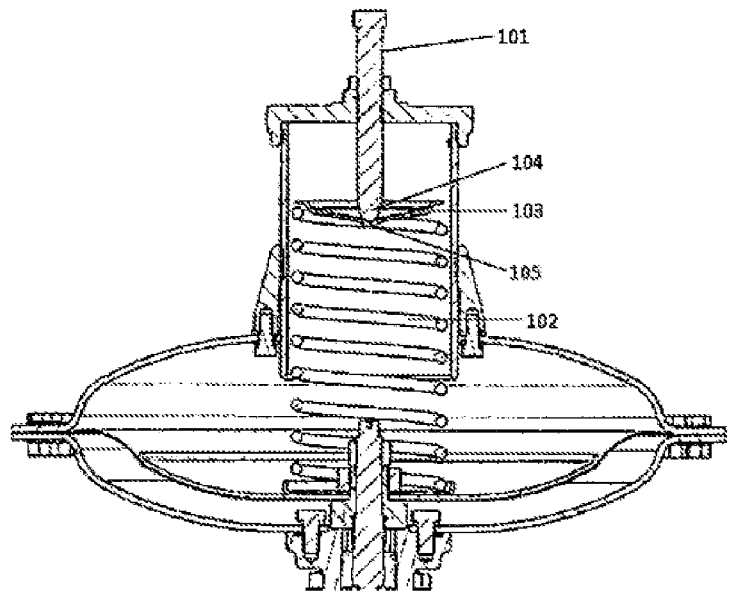
FIG. 1 - PRIOR ART
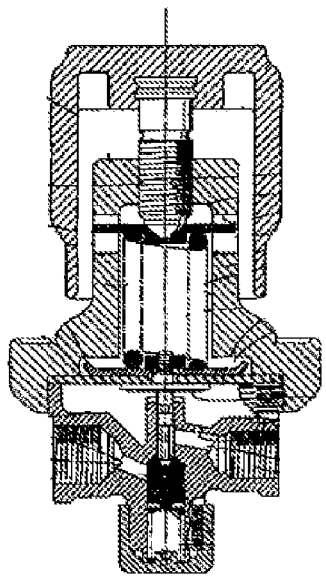
FIG. 2 - PRIOR ART

US 10,267,427 B2

SPRING ADJUSTING DEVICE AND VALVE ASSEMBLY

TECHNICAL FIELD

The present invention relates to a spring adjusting device and a valve assembly comprising the spring adjusting device.

BACKGROUND ART

A spring adjusting device is generally applied to a component which uses a spring to adjust and control parameters, and is especially applied to various valve assemblies. The spring adjusting device generally comprises an adjusting screw rod 101, a spring 102 and a spring seat 103 which is located between the adjusting screw rod and the spring, as shown in FIG. 1. When a valve assembly is used, the adjusting screw rod 101 needs to be rotated to adjust the compression amount of the spring 102, so as to realize the setting and adjustment of setting points of the controlled parameters. The spring seat 103 plays a role of transmitting the force of the adjusting screw rod 101 to the spring 102, and the traditional contact form of the adjusting screw rod and the spring seat is that the end part 104 of the end surface of the adjusting screw rod 101 is in contact with the spring seat 103. When the setting points of the controlled parameters need to be set and adjusted, the adjusting screw rod 101 is rotated, the end part 104 of the end of the adjusting screw rod 101 immediately moves vertically downwards (or upwards), so that the spring seat 103 in contact with the end part 104 moves vertically downwards (or upwards) with the compression of the spring 102 to realize the control of the opening and closing of the port of the valve assembly (not shown in the figures).

However, when the force of the spring is too large during operation, the end part 104 may be separated from a concave hole 105 of the spring seat 103, so that the use of the spring is influenced; and in addition, the spring seat 103 is twisted by taking the end part 104 as a center, so that the spring 102 is bent on the whole. For this reason, the spring 102 is extremely unstable during operation, the setting points of the parameters of the valve assembly drift and the overall working performance of the valve assembly is influenced.

A spring seat is also disclosed in the prior art, the structure of the concave hole is only improved to a conical concave part and no further content is disclosed.

BRIEF SUMMARY

The present disclosure provides a spring adjusting device and a valve assembly including such a device to solve the above-mentioned technical problem.

In accordance with one aspect of the present invention, a spring adjusting device is provided that includes an adjusting screw rod, a spring, and a spring seat which is located between the adjusting screw rod and the spring, wherein a groove is arranged in the spring seat, which can contain an end part of one end of the adjusting screw rod, and is provided with a cylindrical side wall.

In one preferred form, the end part of the adjusting screw rod includes a side wall and a bottom end surface, wherein the side wall of the end part is in clearance fit with the cylindrical side wall of the groove.

In another preferred form, a bearing is arranged between a bottom of the groove and the bottom end surface of the end part.

In another preferred form, the adjusting screw rod further includes a main body part which is connected with the end part, wherein the outer diameter of the main body part is larger than the outer diameter of the end part and a bearing is arranged between the bottom part of the main body part and the top part of the spring seat.

In another preferred form, the bottom part of the end part is in line contact or point contact with the groove bottom of the groove.

In another preferred form, the bottom of the groove is a conical surface or a flat surface.

In the spring adjusting device described herein, since the groove with the cylindrical side wall is arranged in the spring seat, when the force of the spring is too large, the end part, which is held in the groove, is not easily separated from the groove. In addition, since the adjusting screw rod is perpendicular to the spring seat, the spring seat is not twisted by taking the end part as the center and the spring is prevented from being bent on the whole. The spring is thus more stable during operation, the setting points of the parameters of the valve assembly are prevented from drifting, and the overall working performance of the valve assembly is improved.

Further, when the adjusting screw rod is rotated, a bearing arranged between the groove bottom of the groove and the bottom end surface of the end part can greatly reduce the friction force between the bottom of the groove and the bottom end surface. The twisting force applied to the spring seat is minimized, so that the twisting force is prevented from being transferred to the spring and the performance of the spring is improved. In addition, when a bearing is arranged between the bottom part of the main body part and the top part of the spring seat, the same technical effect can be achieved.

Moreover, when the bottom end surface of the end part is designed to be a spherical surface, the bottom end surface is in point contact with the bottom of the groove, thereby reducing the friction force between the end part and the groove, such that components are not easily damaged.

Furthermore, when the groove bottom of the groove is a conical surface, the end part is in line contact with the groove bottom of the groove, such that the friction is reduced and easy to be processed.

In accordance with another aspect of the present invention, a valve assembly is provided that includes any of the spring adjusting devices described above.

BRIEF DESCRIPTION OF THE DRAWINGS

FIG. 1 shows one example of a known valve assembly;

FIG. 2 shows another example of a known valve assembly;

DETAILED DESCRIPTION OF THE DRAWINGS

The present disclosure provides a spring adjusting device and a valve assembly including the spring adjusting device. The spring adjusting device includes an adjusting screw rod, a spring, and a spring seat which is located between the adjusting screw rod and the spring. A groove is arranged in the spring seat and the side wall of the groove is cylindrical, the side wall of the end part is in clearance fit with the side wall of the groove, and the end part can be partially or fully held in the groove. When the force of the spring is too large, since the groove is provided with the cylindrical side wall, which is perpendicular to the radial force, the end part, which is held in the groove, is not easily separated from the groove. In addition, since the adjusting screw rod is perpendicular to the spring seat, the spring seat is not twisted by taking the end part as the center and the spring is prevented from being bent on the whole. The spring is thus more stable during operation, the setting points of the parameters of the valve assembly are prevented from drifting, and the overall working performance of the valve assembly is improved.

The following will describe the preferable embodiments with reference to the drawings which constitute one part of the present invention. The attached drawings illustrate the specific embodiments for achieving the present invention by way of example. The illustrated embodiments are not intended to limit all of the embodiments of the present invention. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

Example I

Figure 3:
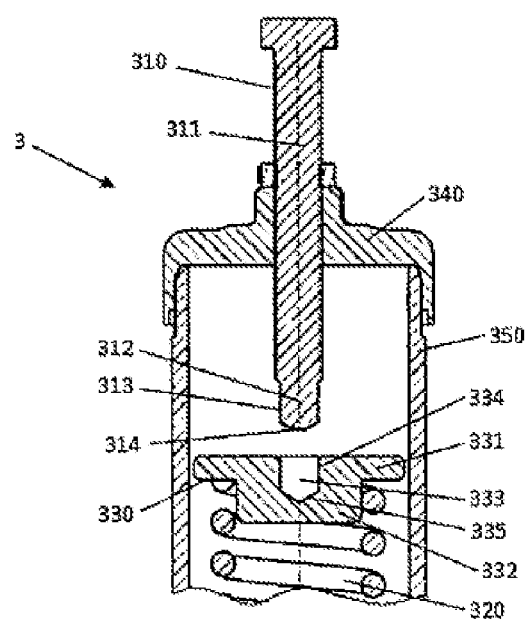
FIG. 3 is a cross-sectional view of a portion of a valve assembly constructed in accordance with a first aspect of the present invention.

As shown in FIG. 3, a first aspect of the present invention provides a valve assembly 3. The valve assembly 3 includes a spring adjusting device, wherein the spring adjusting device mainly includes an adjusting screw rod 310, a spring 320, and a spring seat 330 which is located between the adjusting screw rod 310 and the spring 320. The valve assembly 3 further includes a spring cap 340 and a spring housing 350, and an inner chamber formed by the spring cap 340 and the spring housing 350 is used for containing one end of the adjusting screw rod 310, the spring 320, and the spring seat 330. A groove 333 with a cylindrical side wall 334 is arranged in the spring seat 330. Preferably, the spring seat 330 can be designed to include a top part 331 and a bottom part 332 which extends downwards from the top part 331. The top part 331 blocks above the spring 320 and the bottom part 332, which has an outer diameter which is smaller than the outer diameter of the top part 331, is clamped in the inner chamber of the spring 320. The groove 333 with the cylindrical side wall is arranged in the center of the top part 331. Preferably, the bottom 335 of the groove 333 can be designed to be conical like the shape of a processing tool, so as to easy to be processed and produced.

The adjusting screw rod 310 includes a main body 311 and an end part 312. The end part 312 is located at the end part of the adjusting screw rod 310. The end part 312 is provided with a cylindrical side wall 313 and a bottom end surface 314 which is a spherical surface. The end part 312 is arranged in the inner chamber and is held in the groove 333, and the other end of the adjusting screw rod 310 is arranged outside the inner chamber. The length of the end part 312 is determined according to the depth of the groove 333, so as to enable the end part 312 to be partially or fully held in the groove 333. The inner diameter of the spring 320 is larger than the outer diameter of the bottom part 332, and the outer diameter of the spring 320 is smaller than the outer diameter of the top part 331.

Figure 4:
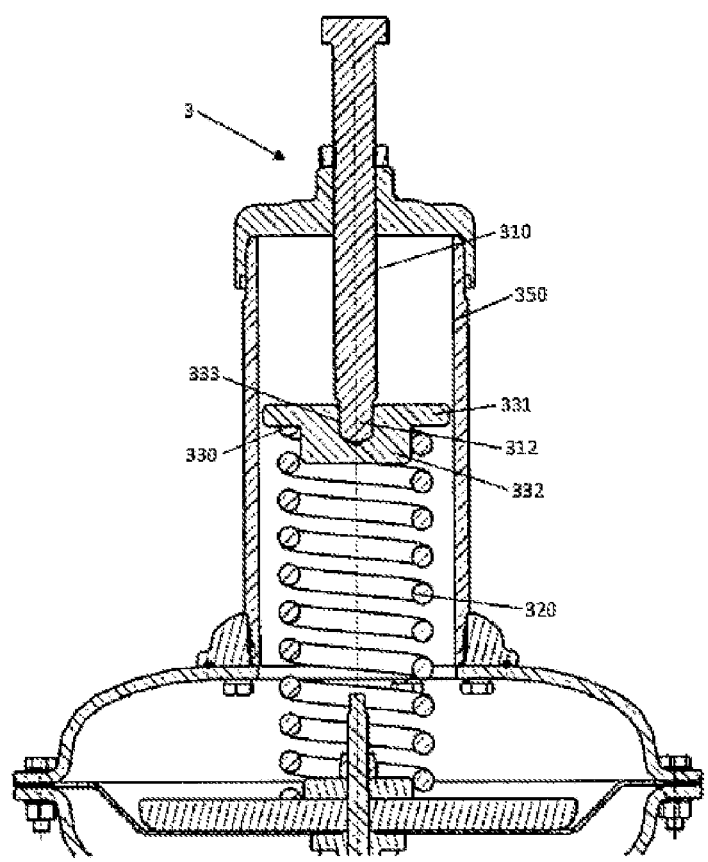
FIG. 4 is a cross-sectional view of the valve assembly of FIG. 3.

FIG. 4 is a cross-sectional view of the valve assembly 3 in a fully assembled state. The spring seat 330 is located at the upper end of the spring 320. The inner diameter of the spring 320 is larger than the outer diameter of the bottom part 332 and is smaller than the outer diameter of the top part 331. The bottom part 332 of the spring seat is held in the spring 330 and the top part 331 is located above the spring 320. The end part 312 is held in the groove 333. The spherical end surface of the end part 312 is in line contact with the conical bottom of the groove 333. Further, the end part 312 and the groove 333 can realize clearance fit. The clearance fit refers to fit with clearance (including the minimum clearance which is equal to zero). When the groove 333 has its maximum size and the end part 312 has its minimum size, the end part 312 and the groove 333, after assembling, are in the loosest clearance fit state. Conversely, when the groove 333 has its minimum size and the end part 312 has its maximum size, the end part 312 and the groove 333, after assembling, are in the tightest clearance fit state. The size of the side wall of the end part 312 is determined according to the size of the side wall of the groove 333, so as to realize the optimum clearance fit between the end part 312 and the groove 333.

The adjusting screw rod 310 can always be perpendicular to and be in contact with the spring seat 330. Even when the force of the spring is too large, since the groove 333 is provided with the cylindrical side wall which is perpendicular to the radial force, the end part 312 held in the groove is not easily separated from the groove 333. In addition, because the adjusting screw rod 310 can be always in perpendicular contact with the spring seat 330, the spring seat 330 is not twisted by taking the end part 312 as the center and the spring 320 is prevented from being bent on the whole. Therefore, the spring 320 is more stable during operation, the setting points of the parameters of the valve assembly 3 are prevented from drifting, and the overall working performance of the valve assembly is improved. In addition, the outer diameter of the top part 331 is smaller than the inner diameter of the spring housing 350, so that the spring seat 330 can be movably arranged in the inner chamber, the spring seat 330 and the spring 320 can freely move up and down with the adjusting screw rod 310, and the adjustment range is larger.

Example II

When the end part is in direct contact with the spring seat, friction occurs between the end part and the spring seat when the adjusting screw rod is rotated, the spring seat is subjected to twisting force, which transfers the twisting force to the spring and the use of the spring is influenced. Therefore, the second aspect of the present invention provides a valve assembly with a bearing. The second aspect of the present invention is described below in connection with FIG. 5 and FIG. 6.

Figure 5:
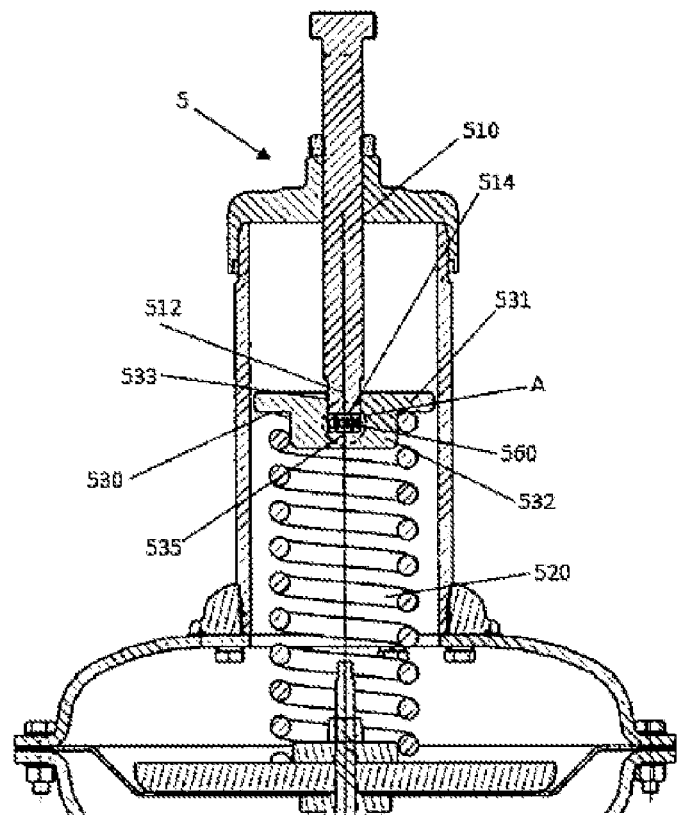
FIG. 5 is a cross-sectional view of another valve assembly constructed in accordance with a second aspect of the present invention.

As shown in FIG. 5, the second aspect of the present invention provides a valve assembly 5. The spring seat 530 is located at the upper end of the spring 520. The bottom part 532 of the spring seat is held in the spring 520 and the top part 531 is located above the spring 520. The end part 512 is held in the groove 533. The shape of the side wall of the end part 512 is determined according to the size of the side wall of the groove 533, so as to enable the end part 512 and the groove 533 to be in clearance fit. Therefore, the end part 512 is provided with a cylindrical side wall which is the same as the side wall of the groove 533. The end surface 514 of the end part 512 is a flat surface, and the groove 533 is provided with a bottom 535 with a flat surface. A bearing 560 is arranged between the end surface 514 and the bottom 535 of the groove.

Figure 6:
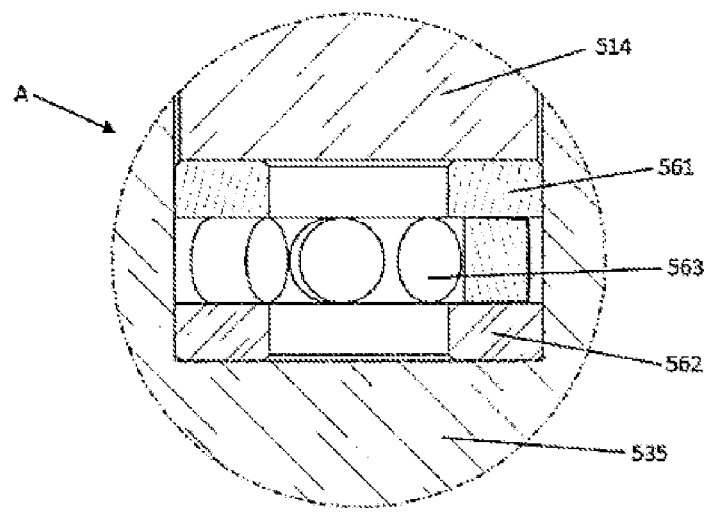
FIG. 6 is a close-up view of part A of the valve assembly shown in FIG. 5.

FIG. 6 is an amplified view of the bearing 560. The bearing 560 includes a shaft piece 561, a seat piece 562, and a plurality of balls 563 which are located between the shaft piece 561 and the seat piece 562. The shaft piece 561 and the seat piece 562 are annular. The bearing 560 is arranged above the bottom 535 of the groove, and the seat piece 562 is in contact with the flat groove bottom 535. When the end part 512 is arranged in the groove 533, the flat end surface 514 of the end part is in contact with the shaft piece 561.

Therefore, as shown in FIG. 5 and FIG. 6, when the adjusting screw rod 510 is rotated, the shaft piece 561 rotates with the end surface 514 of the end part, the seat piece 562 basically does not rotate and friction basically does not occur between the seat piece 562 and the groove bottom 535 in contact with the seat piece 562. In addition to that, the spring can be radially positioned and can be prevented from being bent, because the end surface 514 of the adjusting screw rod 510 is separated from the groove bottom 535 of the spring seat 530, such that when the adjusting screw rod 510 is rotated, no friction occurs between the groove bottom 535 of the spring seat 530 and the end surface 514 of the adjusting screw rod 510, the twisting force applied to the spring seat 530 is minimized, the twisting force is prevented from being transferred to the spring 520, and the performance of the spring is improved.

One skilled in the art should understand that the bearing 560 described herein is just exemplary and the bearing 560 shall not be limited to the structure described above.

Example III

Figure 7:
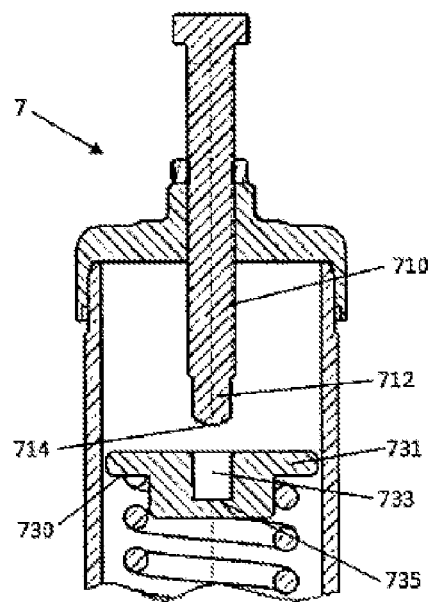
FIG. 7 is a cross-sectional view of a portion of a valve assembly constructed in accordance with a third aspect of the present invention.

As shown in FIG. 7, a third aspect of the present invention provides a valve assembly 7. The valve assembly 7 includes a spring seat 730 with a groove 733, and an adjusting screw rod 710 with an end part 712. The bottom 735 of the groove 733 is a flat surface, and the end surface 714 of the end part 712 is a spherical surface. When the end part 712 is held in the groove 733, the end surface 714 is in point contact with the groove bottom 735. As the contact area is very small, the friction force between the end surface 714 of the end part 712 and the groove bottom 735 of the groove is reduced, the twisting force applied by the adjusting screw rod 710 to the spring is reduced, and the components are not easily damaged. Other components of the valve assembly 7 are similar to those included in the valve assembly 3 described above, and, for the sake of brevity, are not repetitively described here.

Example IV

Figure 8:
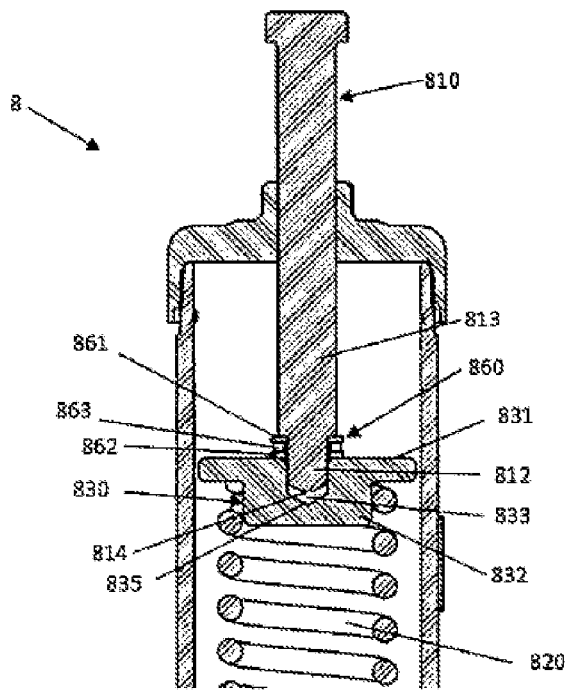
FIG. 8 is a cross-sectional view of a portion of a valve assembly constructed in accordance with a fourth aspect of the present invention.

As shown in FIG. 8, a fourth aspect of the present invention provides a valve assembly 8. The spring seat 830 is located at the upper end of the spring 820. The bottom part 832 of the spring seat is held in the spring 820 and the top part 831 is located above the spring 820. The end part 812 is held in the groove 833. The shape of the side wall of the end part 812 is determined according to the size of the side wall of the groove 833, so as to enable the end part 812 and the groove 833 to be in clearance fit. Therefore, the end part 812 is provided with a cylindrical side wall which is the same as the side wall of the groove 833. The end surface 814 of the end part 812 is a spherical surface, and the groove 833 is provided with a groove bottom 835 with a conical surface. The adjusting screw rod 810 further includes a main body part 813 which is connected with the end part 812. The outer diameter of the main body part 813 is larger than that of the end part 812, so as to permit arrangement of a bearing 860 between the bottom part of the main body part 813 and the top part 831 of the spring seat. The bearing 860 annularly sleeves the side wall of the end part 812 and the end surface 814 of the end part 812 is not in contact with the bottom 835 of the groove.

The bearing 860 includes a shaft piece 861, a seat piece 862, and a plurality of balls 863 which are located between the shaft piece 861 and the seat piece 862. The shaft piece 861 and the seat piece 862 are annular. The bearing 860 is arranged between the bottom part of the main body part 813 and the top part 831 of the spring seat. The shaft piece 861 is in contact with the bottom part of the main body part 813, and the seat piece 862 is in contact with the top part 831 of the spring seat.

When the adjusting screw rod 810 is rotated, the shaft piece 861 rotates with the main body part 813, the seat piece 862 basically does not rotate and friction basically does not occur between the seat piece 862 and the spring seat 830 in contact with the seat piece 862. In addition to that, the spring can be radially positioned and can be prevented from being bent, because the end surface 814 of the adjusting screw rod 810 is separated from the bottom 835 of the spring seat 830 and the bearing 860 exists between the bottom part of the main body part 813 and the spring seat 830, such that when the adjusting screw rod 810 is rotated, no friction occurs between the spring seat 830 and the adjusting screw rod 810, the twisting force applied to the spring seat 830 is minimized, the twisting force is prevented from being transferred to the spring 820, and the performance of the spring is improved.

One skilled in the art should understand that the bearing 860 described herein is just exemplary and the bearing 860 shall not be limited to the structure described above.

Although terms such as first, second and third can be used to describe various components, parts or portions, these components, parts or portions shall not be limited by these terms; and these terms are only used for distinguishing a component, part or portion. When ordinal number terms such as "first", "second", among others, are used herein, they do not contain sequences or orders, unless otherwise clearly stated in the context. Therefore, under the situation of not departing from the description of the exemplary examples, the first component, part or portion described below can be explained as the term of a first component, part or portion.

The invention claimed is:
1. A valve assembly, comprising:
   an upper casing;
   a lower casing coupled to the upper casing;
   a spring housing coupled to the upper casing;
   a bonnet coupled to the spring housing;
   a diaphragm captured between the upper and lower casings;

a first spring seat coupled to and seated against the diaphragm; and a spring adjusting device, comprising:

an adjusting screw rod comprising a main body part and an end part connected to the main body part, the main body part having a first diameter extending through the bonnet, and the end part having second diameter, the adjusting screw rod further comprising a reducing shoulder at a transition point from the first diameter to the second diameter, the reducing shoulder having a third diameter that is not wider than the first diameter of the main body part extending through the bonnet;

a spring having one end seated against the first spring seat;

a second spring seat which is located between the adjusting screw rod and the spring within the spring housing, wherein a groove is arranged in the second spring seat, the groove defined by a cylindrical side wall, wherein the second diameter of the end part of the adjusting screw rod is arranged in the groove; and a bearing arranged between a top end of the second spring seat and a portion of the adjusting screw rod arranged outside of the groove, wherein the bearing comprises a first portion in contact with the top end of the second spring seat, a second portion in contact with the adjusting screw rod at the reducing shoulder, and a layer of curved bodies arranged between the first and second portions.

2. The valve assembly of claim 1, wherein the end part of the adjusting screw rod comprises a side wall; and the side wall of the end part is in clearance fit with the cylindrical side wall of the groove.

3. The valve assembly of claim 1, wherein the bearing is arranged between the main body part and the top end of the spring seat.

4. The valve assembly of claim 1, wherein the bottom of the groove is a conical surface or a flat surface.

5. The valve assembly of claim 1, wherein the second spring seat comprises a first part having a first diameter and a second part having a second diameter less than the first diameter of the first part, and wherein the spring has one end seated against the first part and surrounding the second part.

6. The valve assembly of claim 5, wherein the bearing is arranged between the first part of the second spring seat and the portion of the adjusting screw rod arranged outside of the groove, the first part comprising the top end of the second spring seat.

* * * * *